UNITED STATES PATENT OFFICE.

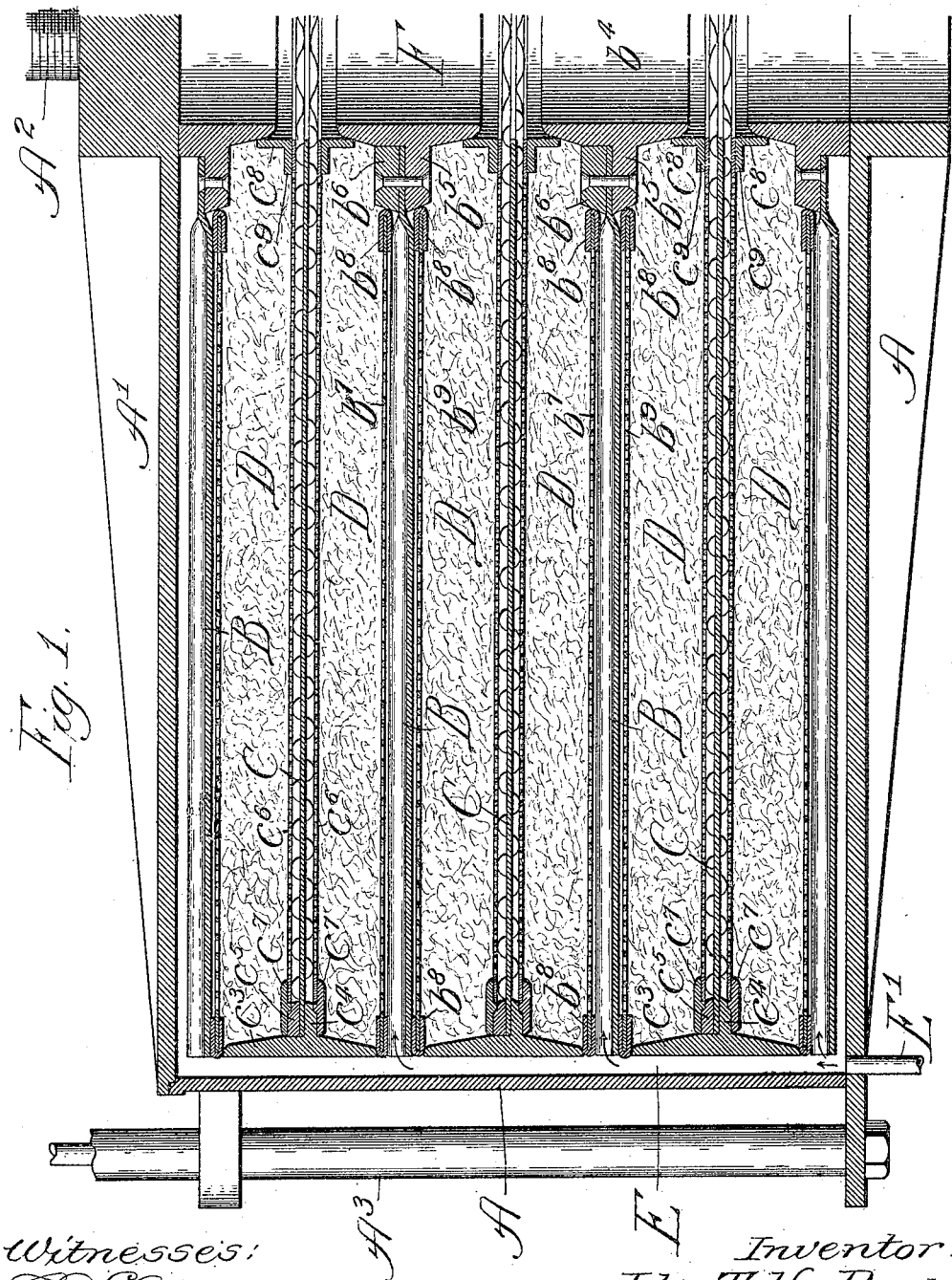

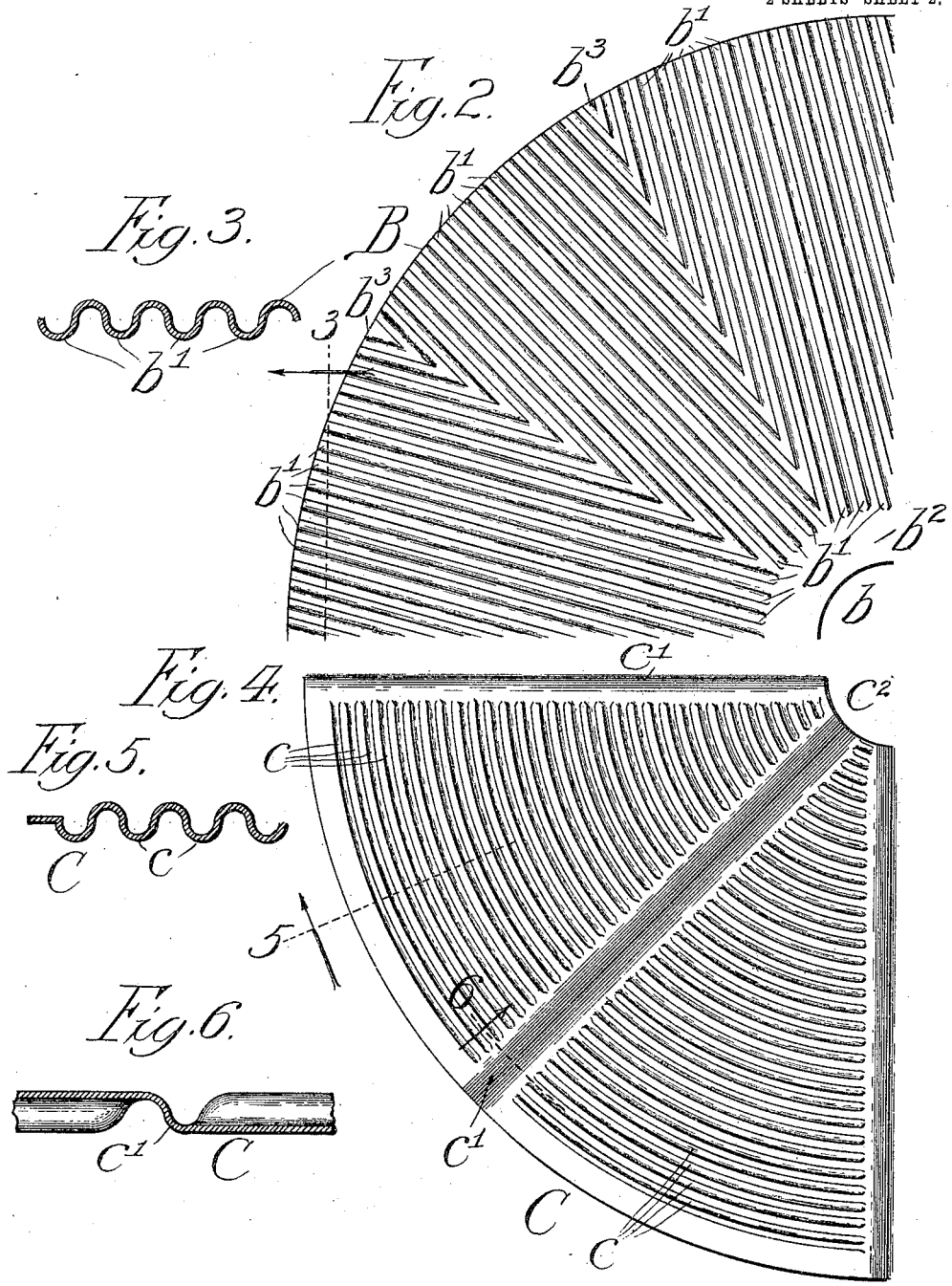

JOHN T. H. PAUL, OF CHICAGO, ILLINOIS, ASSIGNOR TO E. GOLDMAN & COMPANY, OF CHICAGO, ILLINOIS, A CORPORATION OF ILLINOIS.

FILTER.

No. 812,517.  Specification of Letters Patent.  Patented Feb. 13, 1906.

Application filed September 11, 1905. Serial No. 277,896.

*To all whom it may concern:*

Be it known that I, JOHN T. H. PAUL, a citizen of the United States, residing at Chicago, in the county of Cook and State of Illinois, have invented a new and useful Improvement in Filters, of which the following is a specification.

This invention pertains particularly to filters for use in filtering beer or other liquor.

The primary object of the invention is to provide a filter which will permit liquor to pass through freely at moderate pressure, thus insuring high capacity and lessening the liability to clog, which will permit of more ready cleansing than filters now in use, thus rendering the filter sanitary as well as readily pervious to liquor, and which shall be of durable construction and little liable to injury in any manner.

It is characteristic of the improved construction that distributer-plates having channels on both sides running from circumference centerward afford unrestricted ingress to all portions of the filter masses, and collector-plates having circular channels on both sides intersected by radial channels on both sides afford unrestricted egress-passages from all portions of the adjacent surfaces of the filter masses.

The invention is illustrated in its preferred embodiment in the accompanying drawings, in which—

Figure 1 represents a broken vertical section of the filter as constructed with a small number of cells; Fig. 2, a broken plan view of a corrugated distributer-plate employed; Fig. 3, a broken section taken as indicated at line 3 of Fig. 2; Fig. 4, a broken plan view of a corrugated collector-plate employed, and Figs. 5 and 6 broken sections taken as indicated at lines 5 and 6 of Fig. 4.

In the preferred construction, A represents a casing having the usual removable top A', closed in a well-known manner through the medium of a screw $A^2$, actuated by mechanism (not shown) mounted on standards $A^3$, (one shown;) B, a series of distributer-plates serving to conduct the liquor to all parts of the adjacent surfaces of the filter masses; C, a series of collector-plates alternating with the distributer-plates and serving to collect the liquor from all parts of the adjacent surfaces of the filter masses and conduct it through well-defined channels to a central outlet-passage with which the filter is provided, and D masses of filtering material confined in the cells between the distributers and collectors. The cells are arranged within the casing, so as to provide an annular chamber E, to which liquor is supplied through a pipe E', and the outlet is through a central conduit F, comprising ring-sections connected with the distributer and collector elements. Each distributer-plate B comprises a sheet-metal disk having a central perforation $b$, Fig. 2, and provided with groups of approximately radial corrugations $b'$, extending from the circumference to a central ring portion $b^2$ and provided, further, with nested V-shaped corrugations $b^3$, occupying the space between the groups of corrugations $b'$. The ring portion $b^2$ fits over a tube-section $b^4$, forming a part of the conduit F, and rests upon a flange $b^5$, with which the tube-section is provided centrally externally, to which it is secured by a flat ring $b^6$, riveted to the flange. Perforate sheet-metal screens $b^7$ are placed above and below each distributer-plate, the screens having central openings large enough to fit over the peripheries of the flange $b^5$ and ring $b^6$. The inner and outer margins of the screens are provided with metal bindings $b^8$, which are U-shaped in section, as shown.

Each collector-plate C comprises a sheet-metal disk provided with comparatively fine circular corrugations $c$, intersected by relatively large radial corrugations $c'$, running to the central opening $c^2$ of the plate. Encircling each collector-plate is a sleeve $c^3$, provided centrally with an internal flange $c^4$, upon which the outer margin of the plate rests, and above said outer margin is a ring $c^5$, said margin being secured to and between the flange and ring in any desired manner. Above and below each collector-plate are placed perforate sheet-metal screens $c^6$ of finer mesh than the screens $b^7$. These screens $c^6$ are annular and have their outer margins confined between removable rings $c^7$, fitted upon the flange $c^4$ and ring $c^5$, as shown. The inner margins of the screens $c^6$ and the inner margin of the collector-plate between them are confined between separable tube-sections $c^8$, having limited telescopic connection with the tube-sections $b^4$ and having external flanges $c^9$, bearing upon the inner margins of the screens, as shown. The sleeves $c^3$ form circumferential flanges above and below the collector-plates and are substantially in contact with the outer bindings $b^8$ of the screens $b^7$. The space between the distributer-screens and collector-screens and the central conduit and sleeves $c^3$ is occupied by the filtering material D.

The manner of use will be at once understood by those skilled in the art. The corrugations of the distributer-plates enables liquor to pass freely from the annular chamber E to all points of the filter masses adjacent to the plates, the channels being on both sides of the plates. The liquor then passes through the filter masses to the collector-plates, which being channeled on both sides afford passages from all points of the adjacent surfaces of the filter masses to the central conduit of the filter. Because of the fact that definite channels to and from the large areas of the filter masses are provided the liquor will pass freely through the filter under very moderate pressure, and as a result of the moderate pressure, the tendency of the screens to become clogged is reduced to a minimum. Moreover, when the distributer and collector plates do become clogged to an objectionable extent or if for any other reason they require cleansing the cleansing operation is much more readily and effectively performed than is possible where screens of coarse mesh are employed in lieu of the improved distributer and collector plates or where slotted plates are employed for the same purpose as has been proposed by some.

Changes in details of construction are contemplated. Hence no undue limitation should be understood from the foregoing detailed description. Obviously the number of cells in the filter may be varied at will.

What I regard as new, and desire to secure by Letters Patent, is—

1. In a filter, the combination of a plurality of corrugated sheet-metal distributer-plates and corrugated imperforate sheet-metal collector-plates arranged in alternation therewith and suitably spaced with relation thereto, the corrugations of said plates affording surface channels on both sides thereof, screens adjacent to the sides of said plates, filter material massed between the collector and distributer screens, and ingress and egress passages in communication respectively with the passages of the distributer and collector plates, for the purpose set forth.

2. In a filter, the combination of a plurality of alternating corrugated sheet-metal distributer and collector plates having channels on both sides, screens protecting said channels, filter masses between the screens in the spaces between the distributer and collector plates, tube-sections forming a central conduit and connected with the distributer and collector plates, sleeves connected with the circumferential portions of one set of plates, and a casing forming an annular conduit with the cells thus constructed, the channels of the distributer-plates communicating with one conduit and the channels of the collector-plates communicating with the other conduit.

3. In a filter, the combination with a series of distributers, of a series of alternating collectors, each collector comprising an annular corrugated sheet-metal plate having circular corrugations and radial corrugations intersecting the same and running to the center, the corrugations affording channels at both sides of the plates, tube-sections flanking the inner margin of each collector-plate, sleeves provided internally medially with means attached to the circumferential portions of the collector-plates, screens flanking each collector-plate and fitting within the circumferential sleeves, filter material massed in the spaces between the distributers and the collector-plate screens, and ingress and egress conduits communicating with the distributers and collectors, respectively.

4. The combination of a series of collectors and a series of distributers alternating therewith, each distributer comprising an annular corrugated sheet-metal plate, the corrugations affording channels on both sides of the plates extending from the circumference to near the central opening, tube-sections having central external circumferential flanges secured to the inner margins of said plates, tube-sections connected with the collectors and forming with the first-named tube-sections an egress-conduit, circumferential sleeves connected with the collectors and in substantial contact with the outer margins of the distributers, and a casing forming with the cells thus constructed an annular ingress-conduit, the distributer-channels being in communication with the ingress-conduit, for the purpose set forth.

5. The combination of corrugated sheet-metal distributer-plates with channels on both sides thereof, corrugated sheet-metal collector-plates alternating therewith and having channels on both sides, relatively coarse mesh perforate sheet-metal screens flanking each distributer, perforate relatively fine mesh sheet-metal screens protecting the collector-plates, filter masses in the spaces between the screens, and a central and an annular conduit in communication, one with the channels of the distributer-plates, and the other with the channels of the collector-plates, for the purpose set forth.

6. In a filter, the combination of a series of annular sheet-metal distributer-plates having corrugations running from the perimeter toward the center, tube-sections having central external flanges connected with the inner margins of said plates, a series of annular sheet-metal collector-plates having circular corrugations intersected by relatively large radial corrugations leading to the center, sleeves having internal medial flanges connected with the outer margins of the collector-plates, screens flanking the distributer-plates, screens flanking the collector-plates, tube-sections flanking the inner margins of the collector-plates, filter masses in the spaces between the screens, and a casing forming with the cells thus formed an annular conduit, for the purpose set forth.

7. The combination of corrugated sheet-metal distributer-plates with surface channels on both sides thereof, corrugated sheet-metal collector-plates alternating therewith and having surface channels on both sides formed by the corrugations, certain of said channels of said collector-plates being substantially radial, screens flanking said plates, filter masses in the spaces between the screens, and a central and an annular conduit in communication, one with the channels of the distributer-plates and one with the channels of the collector-plates, for the purpose set forth.

JOHN T. H. PAUL.

In presence of—
L. HEISLAR,
J. H. LANDES.